US012665306B1

(12) United States Patent
Chang et al.

(10) Patent No.: US 12,665,306 B1
(45) Date of Patent: Jun. 23, 2026

(54) COMMUNICATION DEVICE

(71) Applicant: Quanta Computer Inc., Taoyuan City (TW)

(72) Inventors: Hung-Chi Chang, Taoyuan City (TW); Chun-I Lin, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 35 days.

(21) Appl. No.: 19/015,072

(22) Filed: Jan. 9, 2025

(30) Foreign Application Priority Data

Dec. 23, 2024 (TW) ................................ 113150168

(51) Int. Cl.
*H01Q 1/48* (2006.01)
*H01Q 1/27* (2006.01)
*H01Q 5/20* (2015.01)
*H01Q 9/04* (2006.01)

(52) U.S. Cl.
CPC ............ *H01Q 9/0421* (2013.01); *H01Q 1/27* (2013.01); *H01Q 1/48* (2013.01); *H01Q 5/20* (2015.01)

(58) Field of Classification Search
CPC ........... H01Q 1/22; H01Q 1/243; H01Q 1/38; H01Q 1/48; H01Q 9/0421; H01Q 5/30–392
See application file for complete search history.

(56) References Cited

U.S. PATENT DOCUMENTS 8,872,726 B2 * 10/2014 Kusanagi ................ H01Q 1/38 343/909
9,276,320 B2 * 3/2016 Wu ......................... H01Q 9/42
9,461,686 B2 * 10/2016 Yang ...................... H01Q 1/245
12,015,214 B2 * 6/2024 Chang .................... H01Q 5/328

* cited by examiner

*Primary Examiner* — Hasan Islam
(74) *Attorney, Agent, or Firm* — McClure, Qualey & Rodack, LLP

(57) ABSTRACT

A communication device includes a ground plane, an antenna structure, a cable, a connection metal element, and a dielectric substrate. The antenna structure has a feeding point. The cable includes a feeding conductor and a grounding conductor. The feeding conductor is coupled to the feeding point. The grounding conductor includes a first conductive region and a second conductive region. The connection metal element is coupled between the first conductive region and the second conductive region of the grounding conductor. The antenna structure and the connection metal element are disposed on the dielectric substrate. The cable is adjacent to the ground plane. Neither the first conductive region nor the second conductive region of the grounding conductor is coupled to the ground plane.

10 Claims, 3 Drawing Sheets

COMMUNICATION DEVICE

CROSS REFERENCE TO RELATED APPLICATIONS

This application claims priority of Taiwan Patent Application No. 113150168 filed on Dec. 23, 2024, the entirety of which is incorporated by reference herein.

BACKGROUND OF THE INVENTION

Field of the Invention

The disclosure generally relates to a communication device, and more particularly, it relates to a communication device and an antenna structure thereof.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may affect the communication quality of the mobile device in which it is installed. Accordingly, it has become a critical challenge for antenna designers to design a small-size, wideband antenna structure.

BRIEF SUMMARY OF THE INVENTION

In an exemplary embodiment, the invention is directed to a communication device that includes a ground plane, an antenna structure, a cable, a connection metal element, and a dielectric substrate. The antenna structure has a feeding point. The cable includes a feeding conductor and a grounding conductor. The feeding conductor is coupled to the feeding point. The grounding conductor includes a first conductive region and a second conductive region. The connection metal element is coupled between the first conductive region and the second conductive region of the grounding conductor. The antenna structure and the connection metal element are disposed on the dielectric substrate. The cable is adjacent to the ground plane. Neither the first conductive region nor the second conductive region of the grounding conductor is coupled to the ground plane.

In some embodiments, the first conductive region and the second conductive region of the grounding conductor are different from each other.

In some embodiments, the cable is a coaxial cable. The feeding conductor is a central conductive line of the coaxial cable. The grounding conductor is a conductive housing of the coaxial cable.

In some embodiments, the cable further includes a nonconductive skin element. The nonconductive skin element is configured to cover the grounding conductor except for the first conductive region and the second conductive region.

In some embodiments, the connection metal element substantially has an inverted U-shape or a meandering shape.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the connection metal element is from 0.25 to 0.6 wavelength of the first frequency band.

In some embodiments, the antenna structure includes a feeding radiation element, a first radiation element, a second radiation element, and a shorting radiation element. The feeding radiation element is coupled to the feeding point. The first radiation element is coupled to the feeding radiation element. The second radiation element is coupled to the feeding radiation element. The first radiation element and the second radiation element substantially extend in opposite directions. The feeding radiation element is further coupled through the shorting radiation element to the first conductive region of the grounding conductor.

In some embodiments, the total length of the feeding radiation element and the first radiation element is substantially equal to 0.25 wavelength of the first frequency band.

In some embodiments, the total length of the feeding radiation element and the second radiation element is substantially equal to 0.25 wavelength of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
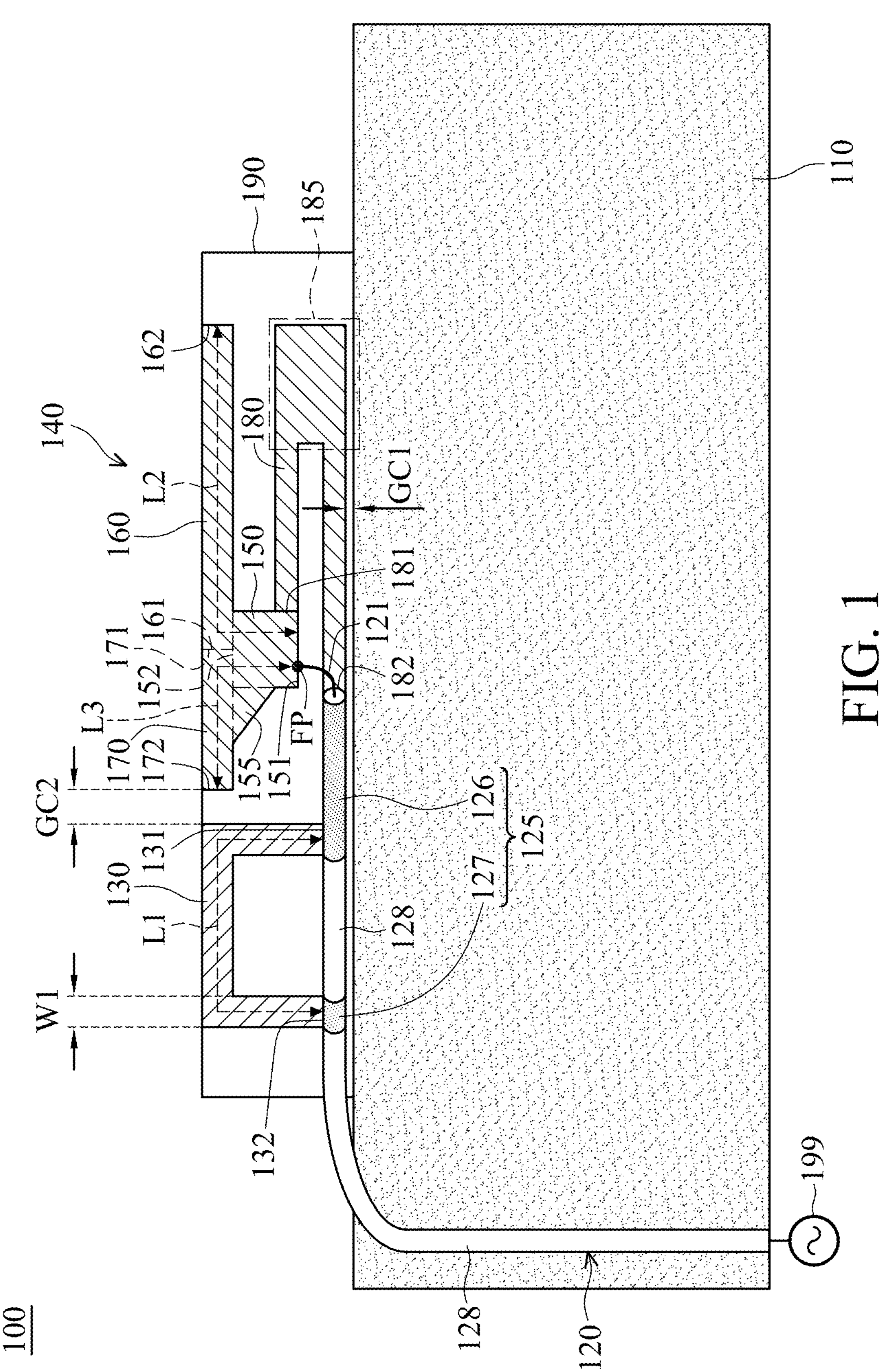
FIG. 1 is a diagram of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be a mobile device, such as a smart phone, a tablet computer, a notebook computer, a wireless access point, a router, or any device with a communication function. Alternatively, the communication device 100 may be an electronic device, such as any unit of IOT (Internet of Things).

As shown in FIG. 1, the communication device 100 includes a ground plane 110, a cable 120, a connection metal element 130, an antenna structure 140, and a dielectric substrate 190. Both the ground element 110 and the antenna structure 140 may be made of metal materials, such as copper, silver, aluminum, iron, or an alloy thereof.

The ground plane 110 may be considered as a system ground element of the communication device 100. The shape and style of the ground plane 110 are not limited in the invention. In some embodiments, the ground plane 110 is implemented with a metal mechanism element, such as a metal back cover of a notebook computer.

The cable 120 includes a feeding conductor 121 and a grounding conductor 125. The feeding conductor 121 is coupled to a feeding point FP of the antenna structure 140. The grounding conductor 125 includes a first conductive region 126 and a second conductive region 127. For example, the first conductive region 126 and the second conductive region 127 of the grounding conductor 125 may be different from each other (or they may have different positions). In some embodiments, the feeding conductor 121 is coupled to a positive electrode of a signal source 199, and the grounding conductor 125 is coupled to a negative electrode of the signal source 199. The signal source 199 may be an RF (Radio Frequency) module.

In some embodiments, the first conductive region 126 of the grounding conductor 125 is adjacent to the feeding conductor 121. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

In some embodiments, the cable 120 further includes a nonconductive skin element 128. The nonconductive skin element 128 is configured to cover the other portions of the grounding conductor 125 except for the first conductive region 126 and the second conductive region 127. For example, the nonconductive skin element 128 may be made of a plastic material, but it is not limited thereto.

In some embodiments, the cable 120 is a coaxial cable. The feeding conductor 121 may be a central conductive line of the coaxial cable. The grounding conductor 125 may be a conductive housing of the coaxial cable. In addition, the first conductive region 126 of the grounding conductor 125 may be used as a first bare copper region of the coaxial cable, and the second conductive region 127 of the grounding conductor 125 may be used as a second bare copper region of the coaxial cable. For example, the first bare copper region may be separated from the second bare copper region by at least one portion of the nonconductive skin element 128.

For example, the connection metal element 130 may substantially have an inverted U-shape. Specifically, the connection metal element 130 has a first end 131 and a second end 132. The first end 131 of the connection metal element 130 is coupled to the first conductive region 126 of the grounding conductor 125. The second end 132 of the connection metal element 130 is coupled to the second conductive region 127 of the grounding conductor 125. That is, the connection metal element 130 is coupled between the first conductive region 126 and the second conductive region 127 of the grounding conductor 125.

Both the connection metal element 130 and the antenna structure 140 are disposed on the same surface of the dielectric substrate 190. For example, the dielectric substrate 190 may be an FR4 (Flame Retardant 4) substrate, a PCB (Printed Circuit Board), or an FPC (Flexible Printed Circuit). In some embodiments, the antenna structure 140 is a planar antenna structure.

For example, the antenna structure 140 may be a PIFA (Planar Inverted F Antenna). However, the invention is not limited thereto. In alternative embodiments, the antenna structure 140 is modified to a monopole antenna, a dipole antenna, a loop antenna, a patch antenna, or a chip antenna.

In the embodiment of FIG. 1, the antenna structure 140 includes a feeding radiation element 150, a first radiation element 160, a second radiation element 170, and a shorting radiation element 180.

The feeding radiation element 150 may substantially have a rectangular shape. Specifically, the feeding radiation element 150 has a first end 151 and a second end 152. The first end 151 of the feeding radiation element 150 is coupled to the feeding point FP. In some embodiments, the feeding radiation element 150 further includes a triangular widening portion 155, which is attached to the second end 152 of the feeding radiation element 150.

The first radiation element 160 may substantially have a relatively long straight-line shape. Specifically, the first radiation element 160 has a first end 161 and a second end 162. The first end 161 of the first radiation element 160 is coupled to the second end 152 of the feeding radiation element 150. The second end 162 of the first radiation element 160 is an open end.

The second radiation element 170 may substantially have a relatively short straight-line shape (compared with the first radiation element 160). Specifically, the second radiation element 170 has a first end 171 and a second end 172. The first end 171 of the second radiation element 170 is coupled to the second end 152 of the feeding radiation element 150 and the first end 161 of the first radiation element 160. The second end 172 of the second radiation element 170 is an open end. For example, the second end 162 of the first radiation element 160 and the second end 172 of the second radiation element 170 may substantially extend in opposite directions and away from each other.

The shorting radiation element 180 may substantially have an inverted C-shape. Specifically, the shorting radiation element 180 has a first end 181 and a second 182. The first end 181 of the shorting radiation element 180 is coupled to the first end 151 of the feeding radiation element 150. The second end 182 of the shorting radiation element 180 is coupled to the first conductive region 126 of the grounding conductor 125. That is, the feeding radiation element 150 is further coupled through the shorting radiation element 180 to the first conductive region 126 of the grounding conductor 125. In some embodiments, the shorting radiation element 180 further includes a rectangular widening portion 185, which is disposed between the first end 181 and the second end 182 of the shorting radiation element 180. In alternative embodiments, the second end 182 of the shorting radiation element 180 extends further toward the cable 120, so as to increase the touching area between the shorting radiation element 180 and the first conductive region 126.

Both the cable 120 and the shorting radiation element 180 are adjacent to the ground plane 110. It should be noted that neither the first conductive region 126 nor the second conductive region 127 of the grounding conductor 125 is coupled to the ground plane 100. Similarly, the shorting radiation element 180 is not coupled to the ground plane 110. In some embodiments, a first gap GC1 is formed between the ground plane 110 and the shorting radiation element 180, and a second gap GC2 is formed between the connection metal element 130 and the second radiation element 170. In other words, the ground plane 110 does not directly touch any of the first conductive region 126, the second conductive region 127, and the shorting radiation element 180.

In some embodiments, the antenna structure 140 can cover a first frequency band, a second frequency band, and a third frequency band. For example, the first frequency band may be from 2400 MHz to 2500 MHz, the second frequency band may be from 5150 MHz to 5850 MHz, and the third frequency band may be from 5925 MHz to 7125 MHz. Therefore, the communication device 100 can support at least the wideband operations of the WLAN (Wireless Local Area Network), Wi-Fi 6E and Wi-Fi 7.

In some embodiments, the operational principles of the communication device 100 will be described as follows. The feeding radiation element 150 and the first radiation element 160 can be excited to generate the first frequency band and the third frequency band as mentioned above. The feeding radiation element 150 and the second radiation element 170 can be excited to generate the second frequency band as mentioned above. The asymmetric feeding mechanism of the antenna structure 140 tends to result in a leakage current since the communication device 100 does not include any ground copper foil for coupling the shorting radiation element 180 to the ground plane 110. In order to suppress the non-ideal leakage current, the proposed communication device 100 of the invention uses the connection metal element 130 to compensate for the aforementioned asymmetric feeding mechanism. According to practical measurements, after the connection metal element 130 is added to the communication device 100, the radiation performance of the antenna structure 140 is almost not negatively affected by the aforementioned leakage current. Accordingly, the invention not only simplifies the manufacturing process of the communication device 100 but also improves the communication quality of the communication device 100.

In some embodiments, the element sizes of the communication device 100 will be described as follows. The length L1 of the connection metal element 130 may be from 0.25 to 0.5 wavelength ($\lambda/4 \sim \lambda/2$) of the first frequency band of the antenna structure 140. The width W1 of the connection metal element 130 may be from 0.8 mm to 1.2 mm. The total length L2 of the feeding radiation element 150 and the first radiation element 160 may be substantially equal to 0.25 wavelength ($\lambda/4$) of the first frequency band of the antenna structure 140. The total length L3 of the feeding radiation element 150 and the second radiation element 170 may be substantially equal to 0.25 wavelength ($\lambda/4$) of the second frequency band of the antenna structure 140. The width of the first gap GC1 may be from 0.1 mm to 0.3 mm. The width of the second gap GC2 may be from 1 mm to 1.5 mm. The above ranges of element sizes are calculated and obtained according to many experimental results, and they help to optimize the operational bandwidth and impedance matching of the antenna structure 140, and also to minimize the related interference of the leakage current of the communication device 100.

The following embodiments will introduce different configurations and detailed structural features of the communication device 100. It should be understood that these figures and descriptions are merely exemplary, rather than limitations of the invention.

Figure 2:
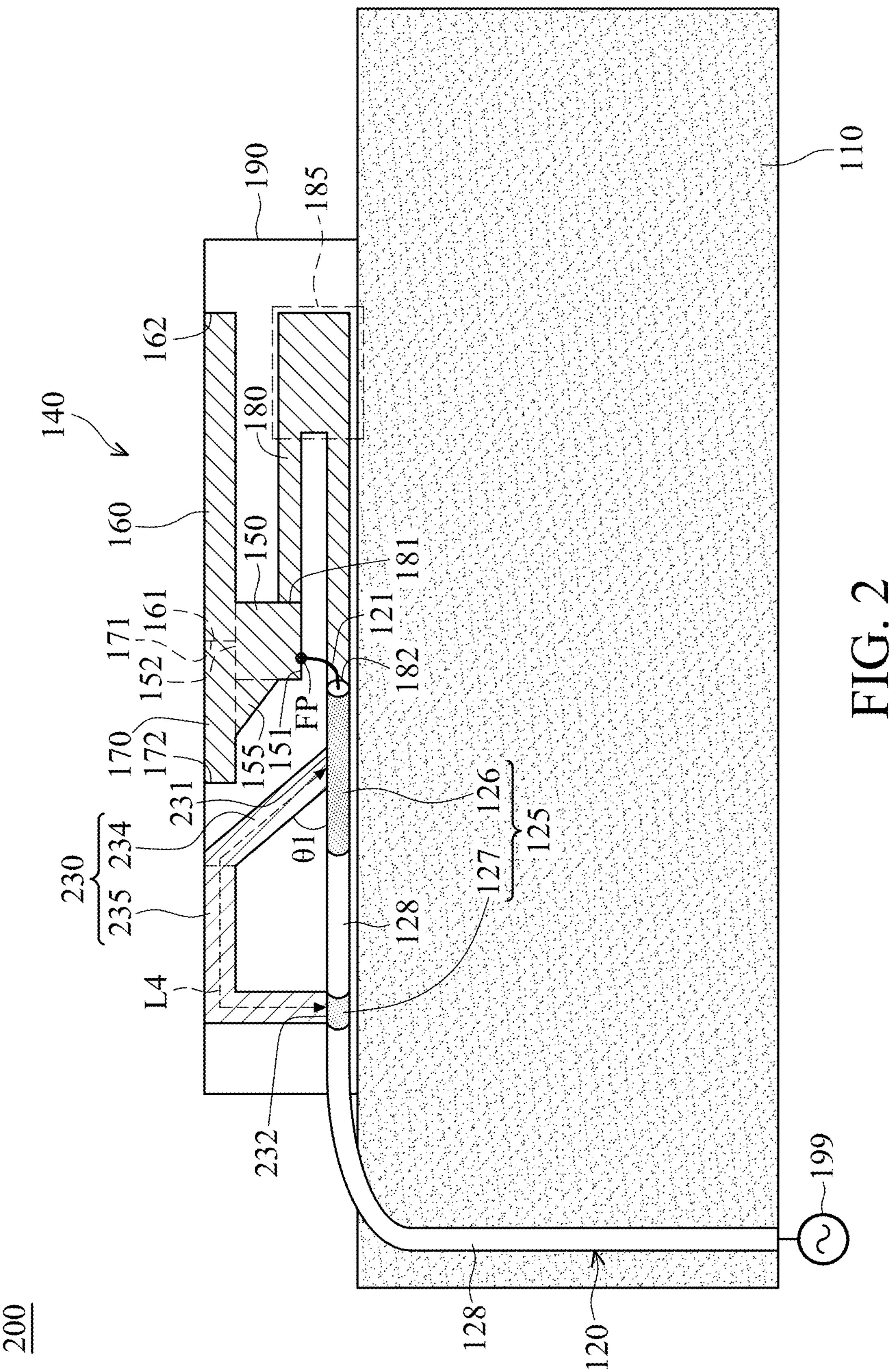
FIG. 2 is a diagram of a communication device according to an embodiment of the invention.

FIG. 2 is a diagram of a communication device 200 according to an embodiment of the invention. FIG. 2 is similar to FIG. 1. In the embodiment of FIG. 2, a connection metal element 230 of the communication device 200 has a different shape. Specifically, the connection metal element 230 has a first end 231 and a second end 232, and includes a sloping portion 234 and an L-shaped portion 235 which are coupled to each other. Furthermore, there is a first angle θ1 formed between the sloping portion 234 of the connection metal element 230 and the shorting radiation element 180 or the first conductive region 126 of the grounding conductor 125. The first angle θ1 may be from 30 to 60 degrees, such as about 40, 45 or 50 degrees. In some embodiments, the length L4 of the connection metal element 230 is from 0.25 to 0.6 wavelength ($\lambda/4 \sim 3\lambda/5$) of the first frequency band of the antenna structure 140. According to practical measurements, the modified design of the connection metal element 230 can help the communication device 200 to apply to different environmental conditions. Other features of the communication device 200 of FIG. 2 are similar to those of the communication device 100 of FIG. 1. Therefore, the two embodiments can achieve similar performance.

Figure 3:
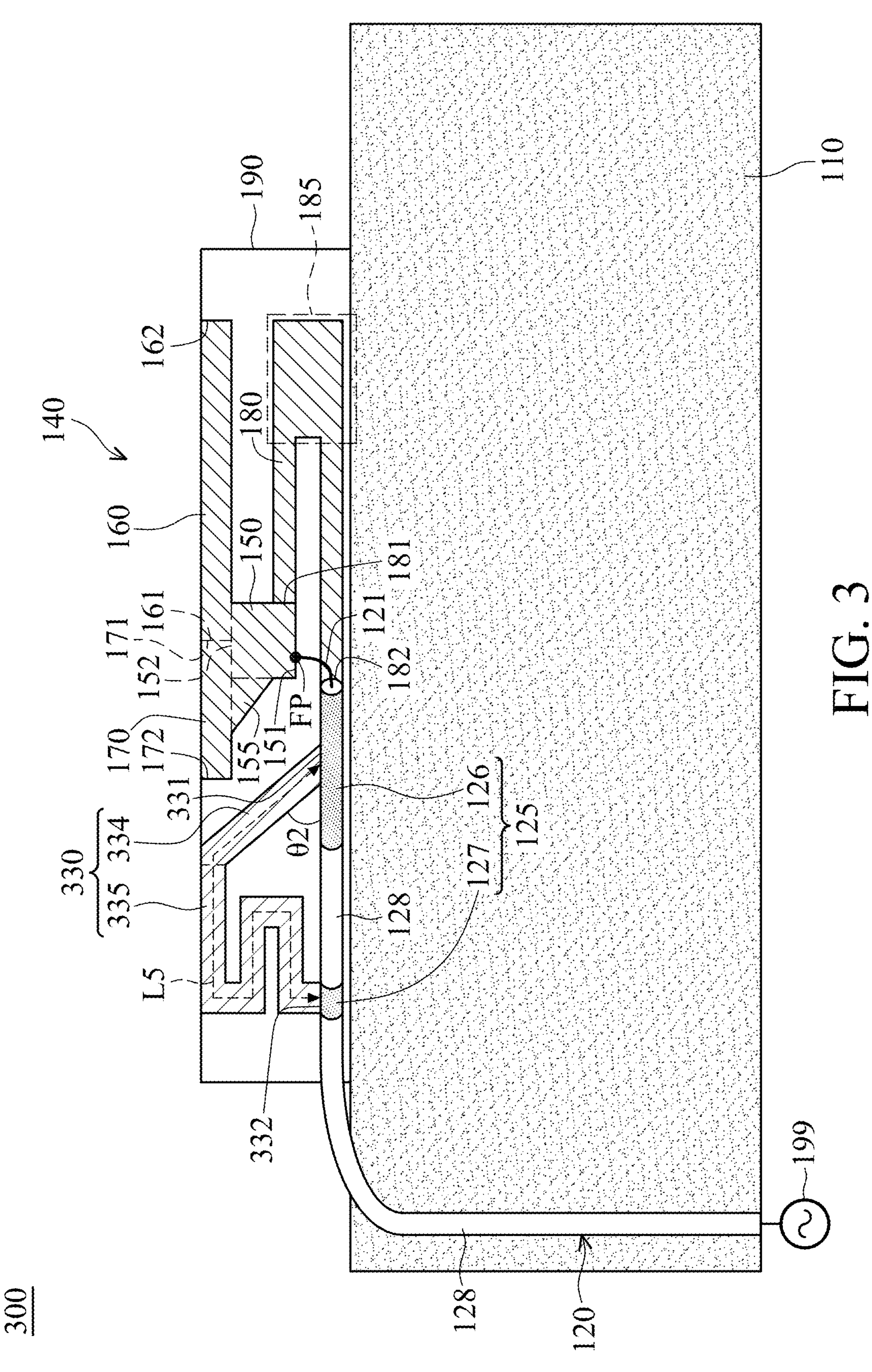
FIG. 3 is a diagram of a communication device according to an embodiment of the invention.

FIG. 3 is a diagram of a communication device 300 according to an embodiment of the invention. FIG. 3 is similar to FIG. 1. In the embodiment of FIG. 3, a connection metal element 330 of the communication device 300 has a meandering shape. Specifically, the connection metal element 330 has a first end 331 and a second end 332, and includes a sloping portion 334 and an S-shaped portion 335 which are coupled to each other. Furthermore, there is a second angle θ2 formed between the sloping portion 334 of the connection metal element 330 and the shorting radiation element 180 or the first conductive region 126 of the grounding conductor 125. The second angle θ2 may be from 20 to 50 degrees, such as about 30, 35 or 40 degrees. In some embodiments, the length L5 of the connection metal element 330 is from 0.25 to 0.6 wavelength (λ/4~3λ/5) of the first frequency band of the antenna structure 140. According to practical measurements, the meandering design of the connection metal element 330 can help to reduce the overall size of the communication device 300. Other features of the communication device 300 of FIG. 3 are similar to those of the communication device 100 of FIG. 1. Therefore, the two embodiments can achieve similar performance.

The invention proposes a novel communication device. In comparison to the conventional design, the invention has at least the advantages of simplifying the manufacturing process, reducing the manufacturing cost, and improving the communication quality. Therefore, the invention is suitable for application in a variety of mobile communication devices or IOT.

Note that the above element sizes, element shapes, and frequency ranges are not limitations of the invention. An antenna designer can fine-tune these settings or values, depending on requirements. It should be understood that the communication device of the invention is not limited to the configurations of FIGS. 1-3. The invention may merely include any one or more features of any one or more embodiments of FIGS. 1-3. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a ground plane;

an antenna structure, having a feeding point;

a cable, comprising a feeding conductor and a grounding conductor, wherein the feeding conductor is coupled to the feeding point, and the grounding conductor comprises a first conductive region and a second conductive region;

a connection metal element, coupled between the first conductive region and the second conductive region of the grounding conductor; and a dielectric substrate, wherein the antenna structure and the connection metal element are disposed on the dielectric substrate;

wherein the cable is adjacent to the ground plane, and neither the first conductive region nor the second conductive region of the grounding conductor is coupled to the ground plane.

2. The communication device as claimed in claim 1, wherein the first conductive region and the second conductive region of the grounding conductor are different from each other.

3. The communication device as claimed in claim 1, wherein the cable is a coaxial cable, the feeding conductor is a central conductive line of the coaxial cable, and the grounding conductor is a conductive housing of the coaxial cable.

4. The communication device as claimed in claim 1, wherein the cable further comprises a nonconductive skin element, and the nonconductive skin element is configured to cover the grounding conductor except for the first conductive region and the second conductive region.

5. The communication device as claimed in claim 1, wherein the connection metal element substantially has an inverted U-shape or a meandering shape.

6. The communication device as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

7. The communication device as claimed in claim 6, wherein a length of the connection metal element is from 0.25 to 0.6 wavelength of the first frequency band.

8. The communication device as claimed in claim 6, wherein the antenna structure comprises:

a feeding radiation element, coupled to the feeding point;

a first radiation element, coupled to the feeding radiation element;

a second radiation element, coupled to the feeding radiation element, wherein the first radiation element and the second radiation element substantially extend in opposite directions; and a shorting radiation element, wherein the feeding radiation element is further coupled through the shorting radiation element to the first conductive region of the grounding conductor.

9. The communication device as claimed in claim 8, wherein a total length of the feeding radiation element and the first radiation element is substantially equal to 0.25 wavelength of the first frequency band.

10. The communication device as claimed in claim 8, wherein a total length of the feeding radiation element and the second radiation element is substantially equal to 0.25 wavelength of the second frequency band.

* * * * *